UNITED STATES PATENT OFFICE.

ALWIN NIESKE, OF DRESDEN, GERMANY.

PROCESS OF PREVENTING BOILER INCRUSTATION.

SPECIFICATION forming part of Letters Patent No. 556,021, dated March 10, 1896.

Application filed January 15, 1895. Serial No. 535,019. (No specimens.)

*To all whom it may concern:*

Be it known that I, ALWIN NIESKE, a subject of the Emperor of Germany, and a resident of Dresden, Chemnitzerstrasse 9, Kingdom of Saxony, Empire of Germany, have invented a new and useful Process for Preventing Boiler Incrustation; and I do hereby declare that the following is a full, clear, and exact description of the invention, which will enable others skilled in the art to which it appertains to make and use the same.

In spite of the innumerable attempts that have been made to find ways and means for the complete prevention of boiler incrustation no one has been in a position to point with confidence to any one of the numerous processes that have been recommended to protect from or prevent boiler incrustation as being perfect and complete and applicable to all cases. Thus in the case of the most-generally-used process—viz., the addition to the feed-water of potassium carbonate, with a view to precipitate the calcium bicarbonate and calcium sulfate as calcium carbonate—that object is only completely attained when the deposited calcium monocarbonate enters into combination with the undecomposed gypsum to form fresh incrustation.

The process suggested about twenty years ago by Ed. Häen, (Hanover,) according to which the calcium bicarbonate is to be precipitated by milk of lime and the gypsum by barium chlorid before the feed-water is run into the boiler, certainly, if strictly and properly carried out, effectually prevents boiler incrustation; but the proper carrying out of that process is so minute and difficult that it can only be done by a trained chemist. To be reliable, moreover, the process requires an enormous area of clarifying-tanks. The greatest difficulty, however, consists in the fact that in precipitating the gypsum with barium chlorid a corresponding quantity of calcium chlorid is taken up by the solution, and as the latter under continuous steam-pressure gives up muriatic (or hydrochloric) acid, which attacks the metallic shell of the boiler—an effect which may have very dangerous results—this process has quite ceased to be employed. Similarly in the employment of the many other means that have been and are recommended for this purpose various other mistakes or misconceptions bring themselves under notice, or, as in many cases, there is no beneficial result whatever.

Contrary to the above-mentioned unsuitable and inefficient methods of removing boiler incrustations when formed or preventing their formation, I have found that by the addition of chromate salts to the feed-water the formation or deposit of all incrustation is thoroughly prevented.

The calcium contained in the feed-water, in the form either of bicarbonate or sulfate, is thrown down in the form of a light sediment at the bottom of the boiler, but the inside surface of the metallic shell remains perfectly clear without being attacked or corroded in the smallest degree.

The chemical reactions which are set up by the introduction of the chromate salt (sodium bichromate upon calcium bicarbonate or calcium sulfate or a mixture of those two salts) may be set forth in the form of equations, as follows:

I. $CaCO_3.CO_2 + Na_2Cr_2O_7 = CaCrO_4 + Na_2CrO_4 + 2CO_2$.

II. $CaSO_4 + Na_2Cr_2O_7 = CaCrO_4 + Na_2SO_4 + CrO_3$.

III. $CaCO_3.CO_2 + CaSO_4 + Na_2Cr_2O_7 = 2CaCrO_4 + Na_2SO_4 + 2CO_2$.

Now, while at ordinary atmospheric pressures calcium chromate in solution is precipitated in the form of calcium carbonate or sulfate by a solution of soda or of Glauber's salts, on the other hand calcium carbonate and sulfate at higher temperatures are thrown down as calcium chromate by chromic-acid salts. An excess of chromic-acid salt or of free chromic acid has no prejudicial influence upon either the metallic parts or the materials employed as packing. These, therefore, are severally unaffected.

In experiments which I have made, extending over continuous working periods of about two months, no chrome salts being added to the feed-water, a thick cutting of incrustation amounting to from ten to twelve millimeters in depth, of extremely-hard fur, very difficult of removal, and composed of gypsum and calcium monocarbonate, was formed on the boiler-shell. Contrariwise, after using chrome salts (it being found best to use the bichromate in slight excess) for a period of from four to five months no incrustation whatever was perceptible in the boiler and nothing but a thin sedimentary mud at the bottom, which was completely gotten rid of by blowing out the boiler. The boiler-surface was perfectly clean and not in the least degree attacked. The employment of chrome salts for this purpose and the process for the complete prevention of boiler incrustation are quite new.

Having now particularly described and ascertained the nature of the said invention, what I desire to claim and secure by Letters Patent is—

The process of preventing boiler incrustation and securing protection therefrom, which consists of the addition to the feed-water therefor of chromates or bichromates, substantially as shown and described.

In witness whereof I hereunto set my hand in presence of two witnesses.

ALWIN NIESKE.

Witnesses:
PAUL ARRDS,
HERNANDO DE SOTO.